United States Patent [19]
de Zarauz

[11] 3,881,974
[45] May 6, 1975

[54] TIRE HAVING TWO-PLY CARCASS MERGING INTO ONE PLY

[75] Inventor: Yves Jacques de Zarauz, Gergovie, France

[73] Assignee: Compagnie Generale des Establissments Michelin, raison sociale Michelin & Cie, Clermont-Ferrand (Pug-de-Dome), France

[22] Filed: Sept. 4, 1973

[21] Appl. No.: 393,785

Related U.S. Application Data

[62] Division of Ser. No. 247,780, April 26, 1972, Pat. No. 3,983,926.

[52] U.S. Cl. ............ 156/123; 156/123 A; 156/124; 156/117; 156/133
[51] Int. Cl. .................... B29h 17/26; B29h 17/28
[58] Field of Search ........ 156/110 R, 123, 133, 124, 156/123 A, 132, 135, 117

[56] References Cited
UNITED STATES PATENTS
1,977,018  10/1934  Shoemaker ...................... 156/133
2,749,959  6/1956  Kunel ............................. 156/124 X
3,500,888  3/1970  Boilean ........................... 152/389 X
3,746,598  7/1973  Neboud ........................... 156/135 X

*Primary Examiner*—Clifton B. Cosby
*Attorney, Agent, or Firm*—Brumbaugh, Graves, Donohue & Raymond

[57] ABSTRACT

A tire carcass is formed of a pair of plies adjacent to each other and extending through the tire from one bead to the other. Each ply comprises cords arranged with the same pitch and along the same direction, and the cords of each ply are staggered with respect to those of the other by half the pitch. The cords of the two plies, in regions of the carcass close to the beads, are located respectively at different distances from the inner wall of the tire. Successive cords of each ply, in regions of the carcass between the midheights of the two sidewalls, are inserted between adjacent cords of the other ply, so that the cords of the two plies, in regions of the carcass between the midheights of the two sidewalls, are located substantially at the same distance from the inner wall of the tire.

4 Claims, 8 Drawing Figures

PATENTED MAY 6 1975  3,881,974

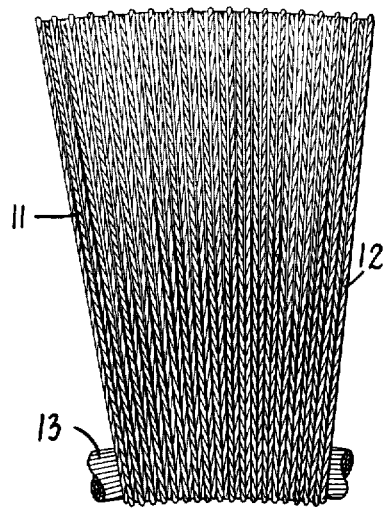
FIG. 2
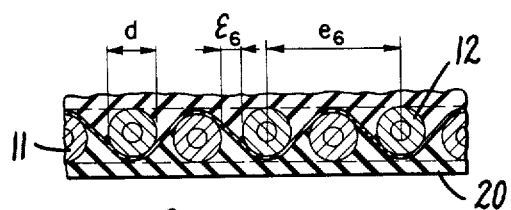
FIG. 6     $e_6 = 3d$
          $\varepsilon_6 = d/2$
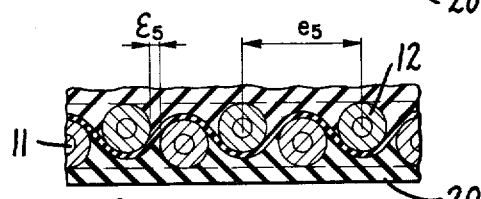
FIG. 5     $e_5 = 21d/8$
          $\varepsilon_5 = 5d/16$
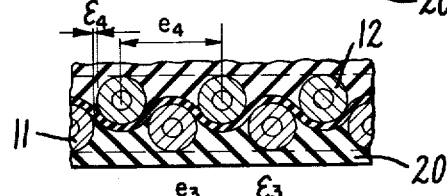
FIG. 4     $e_4 = 9d/4$
          $\varepsilon_4 = d/8$
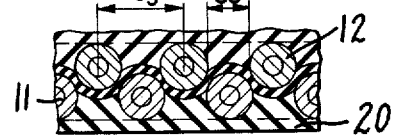
FIG. 3     $e_3 = 15d/8$
          $\varepsilon_3 = 7d/8$
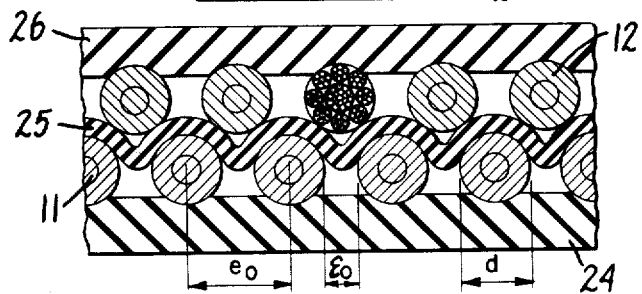
FIG. 7     $e_0 = 3d/2$
          $\varepsilon_0 = d/2$

TIRE HAVING TWO-PLY CARCASS MERGING INTO ONE PLY

This is a divisional of U.S. application Ser. No. 247,780, filed Apr. 26, 1972 now U.S. Pat. No. 3983926.

BACKGROUND OF THE INVENTION

This invention relates to tires of which the carcass has a novel and highly-effective arrangement of reinforcing cords. It relates especially, but not exclusively, to radial-carcass tires and/or to tires having a carcass reinforced with metal cords. It concerns on the one hand the tires themselves and on the other hand a method of manufacturing the tires.

As those skilled in the art know, the manufacture of a tire entails initially the building of a cylindrical blank, which may be formed of the carcass only or which may already combine all the structural parts of the tire. During a second stage, the cylindrical blank is shaped and assumes a substantially toroidal shape. As a result of the shaping, the cords of each carcass ply, which are parallel and equally spaced in the cylindrical blank, move away from each other, retaining their initial spacing at the height of the bead wires and becoming spaced farther and farther apart as they approach the crown of the carcass. In the case of a radial carcass, the cords, remaining in the radial planes, have their spacing or "pitch" increased proportionally to their distance from the axis of the tire.

The shaping thus has the effect of stretching the "bridge" of rubber connecting two adjacent cords of one and the same ply. The width of this bridge of rubber, which is uniform in the cylindrical blank, is increased considerably in the finished tire between the bead and the shoulder. An elementary calculation shows that, in a radial-carcass tire, the width of the bridge of rubber varies between a minimum $\epsilon_o$ at the height of the bead wires and a maximum $\epsilon_s$ at the height of the crown, such that:

$$\epsilon_s = \tau\epsilon_o + d(\tau - 1), \qquad (1)$$

$d$ being the diameter of the cords and $\tau$ the shaping ratio, that is to say, the ratio of the maximum diameter of the carcass, measured at the intersection with the midplane of the tire, and the minimum diameter of the carcass, measured at the base of the beads.

The maximum width $\epsilon_s$ is a multiple of the minimum width $\epsilon_o$, their ratio being, for instance, included between 5 and 30. In certain cases $\epsilon_s$ may assume a rather large value. Thus in tires for construction equipment, one may have a cord diameter $d$ of the order of 3 mm, a shaping ratio $\tau$ greater than or equal to 2, a minimum bridge of rubber $\epsilon_o$ of the order of 0.4 mm, and therefore a maximum bridge of rubber $\epsilon_s$ of the order of 4 mm, namely ten times larger than $\epsilon_o$.

It is undersirable for the rubber bridges between adjacent cords to stretch excessively, as this has the effect of accentuating the heterogeneity of the carcass. This is all the more undersirable when the wider bridges of rubber are located in the upper zones of the sides of the tire, which zones the subject to the greatest deformations and therefore the greatest stresses. These zones are therefore less reinforced even though they are more exposed and subjected to stress. In order to avoid overloading and excessive widening of the bridges of rubber, two remedies are suggested by formula 1 set forth above.

A first remedy consists in reducing as much as possible the minimum space $\epsilon_o$ between cords so as to limit the maximum space $\epsilon_s$. In other words, for the building of the carcass one selects plies of which the cords have a pitch, that is to say, a center-to-center distance, which is as small as possible. This method, however, has only limited possibilities. It is obvious that one cannot reduce the pitch and the width of the bridge of rubber beyond a minimum value for each type of cord. In the above numerical example it is difficult to reduce the minimum bridge of rubber between cords of 3 mm diameter beyond 0.4 mm or 0.3 mm. Assuming that one succeeds in reaching 0.1 mm, the maximum bridge of rubber $\epsilon_s$ will be reduced only by about 0.2 mm.

Another remedy consists in using cords of smaller diameter, distributed in several carcass plies. Formula 1 shows that, if, instead of a single carcass ply of cards of diameter $d$ with a minimum space of $\epsilon_o$, one employs two equivalent plies of cords of diameter $d\sqrt{2}/2$ spaced apart a distance $\epsilon_o\sqrt{2}/2$, the maximum bridge of rubber will thus be reduced to $\epsilon_s\sqrt{2}/2$ and will therefore be decreased by about 30 percent.

However, this remedy, while advantageous in theory, proves unacceptable in practice, particularly in the case of metal cords or cords of material of a high modulus of elasticity. Experience shows that a combination of two superimposed plies whose cords are parallel and highly resistant to tension and compression forms a sort of very rigid beam which is much more rigid than a single ply of thicker cords or than a group of plies the cords of which intersect. Accordingly, if on the one hand one decreases the stresses on the bridges of rubber by the use of heavier cords, on the other hand one increases those stresses by the use of several plies of parallel superimposed cords on which the same deformation is imposed.

SUMMARY OF THE INVENTION

An object of the invention is to remedy the deficiencies of the prior art noted above. In particular, an object of the invention is to reduce the maximum width of the bridge of rubber between adjacent carcass cords without thereby producing a harmful stiffening of the sidewalls, particularly in the regions adjacent to the tread where they are subjected to strong deformations and strong stresses. Another object of the invention is to obtain this result without having to modify in an undesirable way the ordinary tire building operations.

The foregoing and other objects are attained in accordance with the invention by the provision of a tire having a carcass formed of at least one pair of adjacent plies extending from one bead to the other and formed of cords arranged with the same pitch and with the same orientation. The tire is characterized in that the cords of the pair of plies are staggered half a pitch from one ply to the next. Within the regions of the carcass close to the beads, the cords of the two plies are respectively arranged at different distances from the inner wall of the tire. In the region of the carcass between the middle of the two sidewalls, successive cords of one ply are inserted between adjacent cords of the other ply, and the cords of both plies are substantially at the same distance from the inner wall of the tire.

The pitch of the cords of a ply is the distance between adjacent cords measured from center to center. The pitch is equal to the sum of the diameter of one of the cords and the distance between adjacent cords, that is to say, the width of the bridge of rubber.

The invention thus comprises two plies of parallel cords arranged in such a manner that each cord of one ply is at an equal distance from two cords of the other ply. The cords of the two plies are superimposed in the sidewalls in the zones adjacent to the beads but are juxtaposed as though they were part of a single ply in the regions of the sidewalls adajcent to the tread and below the tread.

The insertion of the two plies one within the other makes it possible to avoid both a stiffening by superimposition of layers of parallel cords and a widening of the bridges of rubber, particularly in the regions where this stiffening and widening are harmful.

The invention is preferably applied to a tire having a radial carcass and/or a carcass reinforced with cords of material of high modulus of elasticity and in particular metal cords.

Calculation shows that, for a radial tire in accordance with the invention, the maximum width $\epsilon_s$ of the bridge of rubber between carcass cords at the height of the intersection with the middle plane is given by the formula:

$$\epsilon_s = \frac{\tau \epsilon_o}{2} + \frac{d}{2} (\tau - 2) \quad (2)$$

In this formula $\epsilon_s$ designates the maximum width of the bridges of rubber between cords of the ply resulting from the merging of the two plies and $\epsilon_o$ the minimum distance apart of the cords of one and the same layer.

It can be observed that for $\tau = 2$, formula 2 reduces to $\epsilon_s = \epsilon_o$. Accordingly, in general, for all tires having an ordinary meridian cross section, that is to say, a shaping ratio equal to or only slightly different from 2, the bridge of rubber between adjacent cords of the carcass is substantially the same at the shoulder and the crown as at the bead wires, whatever the diameter of the cords.

In accordance with the invention $\epsilon_o$ and $\epsilon_s$ are preferably close to half the diameter of the cords and in any event between one-fourth and three-quarters of the diameter of the cords.

The method in a cordance with the invention for the manufacture of a tire, by forming a cylindrical blank and subsequently shaping it is characterized in that, in order to build the cylindrical blank, there is used at least one ply formed of two superimposed layers of cords having the same orientation and the same pitch $e$. The cords of one layer are staggered by half a pitch from those of the other layer, and the pitch $e$ is between $2d$ and $4d/\tau + 1$, $d$ being the diameter of the cords and $\tau$ the shaping ratio of the carcass.

In preferred embodiment of the invention, the cords are of metal, and a single composite ply is employed, the cords of which are arranged parallel to the axis of the cylindrical blank. The pitch $e$ is close to $3d/2$ and is between $5d/4$ and $7d/4$ for ordinary shaping ratios.

It is important to assure the relative positioning of the carcass cords having the same orientation not merely during the stage of the building of the carcass or of the cylindrical blank but also at the stage of the forming of the plies. This leads to the production of composite plies having two layers of parallel cords staggered half a pitch from one layer to the other.

As shown by experience, when two cable plies, which are identical but have been manufactured separately and are placed in such a manner that the cords are parallel, are superimposed in the building of a carcass, the two plies remain separate and superimposed in the finished tire. As a matter of fact, it would be necessary to specify the parallelism and equal spacing of the cords of the two plies with a precision which it is impossible to attain in practice in order to avoid any overlapping and crossing of cords belonging to the two plies. This precision cannot be obtained since one cannot prevent deformations of the plies during their manufacture, handling and positioning, and there is no reason for the deformations of one ply to be identical to those of another ply, or for there to be a superpositioning of identical irregularities in manufacture upon positioning. The width of a ply intended for the manufacture of a carcass is about 800 to 1000 times the diameter of its cords. In order to avoid any overlapping and crossing of wires upon the superimposing of two plies, there is therefore required a precision of parallelism of the cords of the order of one-sixth of a degree.

On the other hand, when the relative positioning of the cords of the carcass is effected during the construction of a composite ply having two layers of cords, it is easy to retain this relative positioning subsequently, since the two layers undergo the same accidental deformations during handling and positioning.

In accordance with the invention, the pitch $e$ of the cords of the two layers of the composite ply is selected as a function of the height at which it is desired that these two layers of cords merge in the finished tire. For a shaping ratio $\tau$ close to 2, the pitch must be equal to $4d/3$ if one desires the spacing between cords of the same layer to be equal to the diameter of the cords $d$ at the midheight of the sidewall, and the merging of the two layers of cables to start at this height. With a pitch close to $3d/2$, the merging commences at one-third the height of the carcass.

A composite ply with two layers of parallel cables staggered from one layer to the other by half a pitch can be obtained by any suitable means. For example, one can use calenders of a type customary for the making of plies. One can also proceed by winding around a cylinder. For this purpose a first skim of rubber is placed on the cylinder, and then, by the helicoidal winding of a cord, a first layer of cords with a pitch $e$; a second skim is then applied, and then, by the helicoidal winding of a cord, a second layer of cords with pitch $e$ staggered with respect to the first by $e/2$; finally a third skim is applied. It is easy to obtain a precise staggering of the cords of the two layers if one takes care properly to take up the play of the guide members. It is then sufficient to cut out the sleeve obtained along generatrices of the drum in order to obtain lengths of composite ply with two layers of staggered and parallel cords which can be used to build carcasses by placing them on a tire building drum with their cords oriented parallel to the axis of the drum. The relative arrangement of the cords does not change during the handling.

One advantage of the invention is that, because of the use of composite plies, it makes it possible to manufacture tires of very large dimensions which can withstand very high loads. With the technique of the single-ply radial carcass, it is necessary in order to pass from one size tire to a larger size to use thicker cords, which gives rise to larger and larger bridges of rubber in the sensitive zones. A radial carcass with a composite ply in accordance with the invention, although formed of cords of smaller diameter, can present a greater resistance per centimeter and smaller bridges of rubber than a carcass of the same size formed of a ply with a single layer of cords.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIG. 2 is a fragmentary view in side elevation of the carcass of the tire of FIG. 1;

FIGS. 3, 4, 5 and 6 are sectional views on a larger scale of the tire of FIG. 1 along the lines 3—3, 4—4, 5—5 and 6—6 of FIG. 1;

FIG. 7 is a sectional view on the same scale as FIGS. 3 to 6 of a composite ply used to construct the carcass of the tire shown in FIGS. 1 to 6.

DESCRIPTION OF THE PREFERRED EMBODIMENTS

Figure 1:
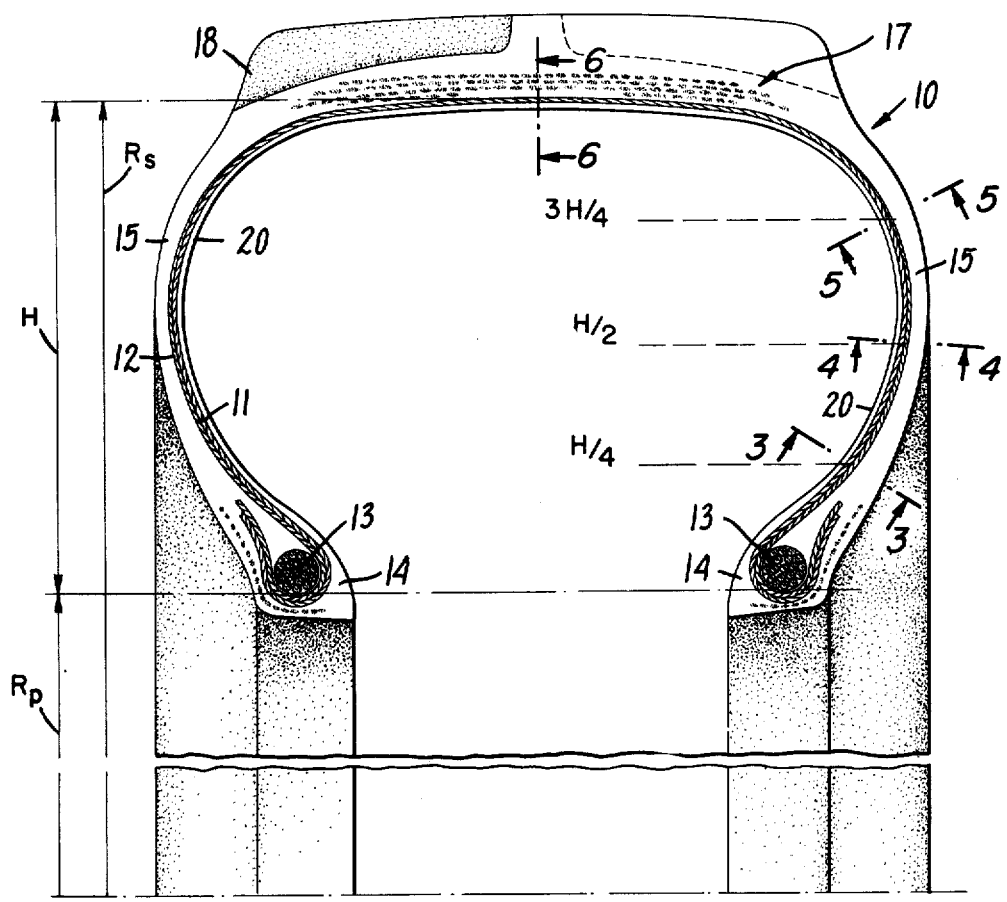
FIG. 1 is a view in radial section of a tire in accordance with the invention.

FIG. 1 shows a tire 10 in accordance with the invention.

The carcass is distinguished in that it comprises two plies of cords 11 and 12 arranged in radial planes of the tire, as shown in FIG. 2. The carcass is anchored at its ends around two bead wires 13 located in the beads 14. It extends into the sidewalls 15 and below the tread reinforcement 17 composed of five superimposed plies of metal cords which stiffen the tread 18. FIG. 1 illustrates the definition of the shaping ratio of the carcass, this ratio being equal to Rs/Rp.

As can be noted from the sectional views of FIGS. 3 to 6, the cords of the ply 11 and those of the ply 12 are substantially at the same distance from the inner wall 20 of the tire in the region of the carcass which is remote from the bead wires 13 (FIGS. 5 and 6) and are at definitely different distances therefrom in the vicinity of the bead wires 13 (FIGS. 3 and 4). On the other hand, all points of the carcass, each cord of the ply 11 is equidistant from the two closest cords located in the ply 12.

In FIG. 7 there is shown in section the composite ply with two layers of cords 11 and 12 as it is before positioning and as it is in the tire at the height of the bead wires 13. In addition to the layers of cords 11 and 12, it comprises three layers of rubber 24, 25, 26, the intermediate layer 25 being thinner than the other two.

FIGS. 3 to 7 there have been indicated the values of the pitch $e$ and of the rubber bridges $\epsilon$ at the different heights, for the case of a shaping ratio of 2.

Figure 8:
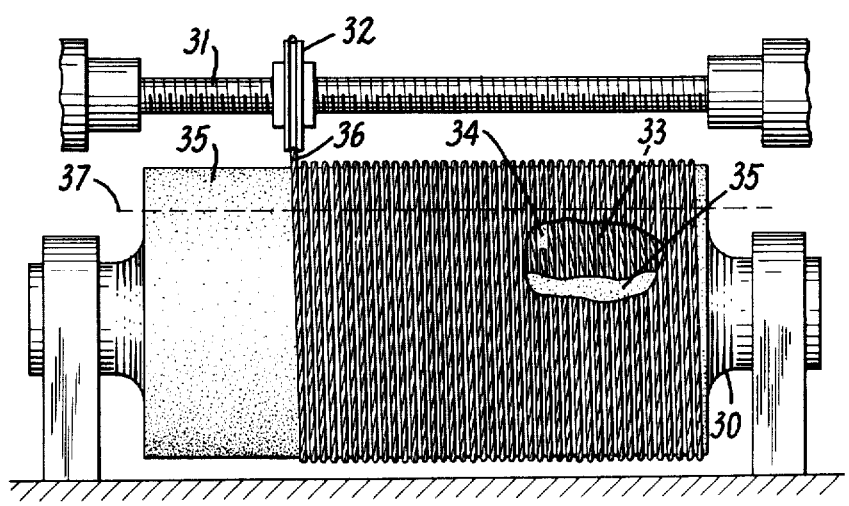
FIG. 8 is an elevational view, on a reduced scale, showing the composite ply of FIG. 7 on a cylinder.

FIG. 8 shows how one can obtain a composite ply with two layers of cords 11 and 12 with pitch $e$ in each layer, staggered half a pitch $e/2$ from one layer to the other.

There can be noted a cylinder 30 which can be rotated around its axis by a drive system known per se and not shown in the drawing. There can also be noted a lead screw 31 on which a positioning pulley 32 slides. The pulley 32 can move at a speed which is strictly proportional to the speed of rotation of the cylinder 30. A cord 33 corresponding to the cord 11 of FIGS. 1 to 7 has been positioned as a helix around the cylinder 30 which was previously covered with a thin layer of rubber 34 over substantially the entire length of the cylinder. After the positioning and rolling of a very thin separating gum layer 35 in order to cause it to penetrate properly between the turns of the cord 33, the pulley 32 positions a second cord 36 corresponding to the cord 12 of FIGS. 1 to 7 wound in a helix with the same pitch as the cord 33. Before starting the laying of the cord 36, the position of the pulley 32 has been precisely adjusted to take up the laying play and obtain a second layer staggered by half a pitch from the helical winding of the cord 33. A last thin layer of rubber (not shown) is placed on the second cord layer 36. The composite ply is then cut along a generatrix 37 to obtain a ply whose cords are perpendicular to the edges, the length of which is equal to that of the cylinder 30 and the width of which is equal to the circumference of the cross section of the cylinder 30.

Certain advantages of the invention appear from the following table, which compares two radialcarcass tires in accordance with the invention with a conventional radial-carcass tire.

|  | Radial, composite ply No. 1 | Radial, conventional ply | Radial, composite ply No. 2 |
| --- | --- | --- | --- |
| Cord used: |  |  |  |
| a) core | 3+9 wires of 0.26 mm | 3+9 wires of 0.30 mm | 3+9 wires of 0.30 mm |
| b) surrounding | 9 strands of 3 wires of 0.26 mm | 8 strands of 1+9 wires of 0.26 mm | 8 strands of 1+9 wires of 0.26 mm |
| c) diameter | 2.4 mm | 3.1 mm | 3.1 mm |
| d) material | steel | steel | steel |
| e) strength | 520 kg | 1000 kg | 1000 kg |
| Laying pitch in each layer | 3.6 mm | 3.5 mm | 4.6 mm |
| Resistance per centimeter of carcass | 2850 kg | 2850 kg | 4350 kg |
| Maximum bridge of rubber (for a shaping ratio of 2) | 1.2 mm | 3.9 mm | 1.5 mm |

As can be seen, the radial tire with composite ply No. 1 has a carcass which has the same strength per cm as the conventional radial-carcass tire. However, it uses cords which are definitely smaller and which are connected at the shoulder by rubber bridges which are three times smaller.

On the other hand, the radial tire with composite ply No. 2 employs the same cords as the conventional radial-carcass tire. The strength of the carcass is increased by more than 50 percent, while the rubber bridges in the vicinity of the tread have a width which is more than one-half less.

The advantages of the invention are considerable. They will be all the more evident when the cord used in the conventional radial-carcass tire employed in the above comparison is the largest metal cord at present used in tires (of a size of 37.5 × 39): by using the same cord one can increase the strength of a carcass by 50 percent and thus have a carcass which can be used in tires of larger size and capable of withstanding very much larger loads. it goes without saying that the invention is not limited to the case of giant tires, and that it also makes possible better utilization and greater efficiency of the carcasses of tires of smaller dimensions.

Thus there is provided in accordance with the invention a novel and highly-effective tire and method of its manufacture. Many modifications of the representative embodiments disclosed herein will occur to those skilled in the art. For example, a composite ply can be formed with two layers of cords which differ from one layer to the other but which are arranged with the same pitch and staggered by half a pitch from one layer to the other. Accordingly, the invention is to be construed as including all the embodiments thereof that are within the scope of the appended claims.

I claim:

1. A method of manufacturing a tire with a desired shaping ratio $\tau$ by the building of a cylindrical blank and subsequent shaping of the blank, comprising the steps of forming at least one ply comprising two superimposed layers of cords having the same orientation and the same pitch $e$, for the purpose of constituting a carcass for the tire, the carcass when shaped including a pair of sidewalls, staggering the cords of each layer by half the pitch $e/2$ with respect to those of the other layer, the pitch e being between $4d/(\tau + 1)$ and $2d$, where $d$ is the diameter of the cords, and then shaping the blank in accordance with the shaping ratio $\tau$, so that, in the region of the carcass between the middle of the two sidewalls, successive cords of one layer are inserted, during and as a result of said shaping, between adjacent cords of the other layer, and the cords of both layers are substantially at the same distance from the inner wall of the tire.

2. A method according to claim 1 comprising the step of forming a single ply of metal cords arranged parallel to the axis of the cylindrical blank.

3. A method according to claim 1 comprising the step of limiting the pitch $e$ to a value between $5d/4$ and $7d/4$.

4. A ply of cords for reinforcing rubber articles made according to the method of claim 1, comprising two layers of cords which are substantially identical and arranged along the same pitch $e$, the cords of each layer being staggered by half the pitch $e/2$ with respect to those of the other layer.

* * * * *